(12) United States Patent
DeMarco

(10) Patent No.: US 6,569,217 B1
(45) Date of Patent: May 27, 2003

(54) INDUSTRIAL DUST COLLECTOR WITH MULTIPLE FILTER COMPARTMENTS

(75) Inventor: Thomas M. DeMarco, 2304 Cherry Valley Rd., Woodstock, IL (US) 60086

(73) Assignee: Thomas M. DeMarco, Woodstock, IL (US)

( * ) Notice: Subject to any disclaimer, the term of this patent is extended or adjusted under 35 U.S.C. 154(b) by 0 days.

(21) Appl. No.: 09/569,831

(22) Filed: May 10, 2000

(51) Int. Cl.$^7$ .................. B01D 50/00; B01D 45/00; B01D 46/00

(52) U.S. Cl. .............. 55/324; 55/282; 55/302; 55/334; 55/337; 55/341.5; 55/342; 55/345; 55/350.1; 55/434; 55/447; 55/462; 55/467; 55/DIG. 3; 96/380; 96/382; 96/384

(58) Field of Search .................. 55/282, 293, 302, 55/320, 321, 324, 334, 337, 341.5, 342, 345, 350.1, 361, 434, 447, 459.1, 462, 467, DIG. 3; 96/380, 381, 382, 384, 385, 387, 388; 95/268, 269, 271, 280

(56) References Cited

U.S. PATENT DOCUMENTS

| | | | |
|---|---|---|---|
| 485,915 A | 11/1892 | Duckham | |
| 795,412 A | 7/1905 | Olson | |
| 940,076 A | 11/1909 | Seaver | |
| 1,153,751 A | 9/1915 | Beth | |
| 1,333,325 A | 3/1920 | McGee | |
| 1,455,116 A | 5/1923 | Lumley | |
| 1,590,885 A | 6/1926 | Burns et al. | |
| 1,591,147 A | 7/1926 | Wales | |
| 1,610,119 A | 12/1926 | Butler | |
| 1,842,294 A | 1/1932 | Schrader | |
| 1,867,856 A | 7/1932 | McCrery | |
| 2,152,756 A | 4/1939 | Billmyre | 183/37 |
| 2,182,862 A | 12/1939 | Allardice | |
| 2,226,045 A | 12/1940 | Baldwin | 183/71 |
| 2,276,805 A | 3/1942 | Tolman, Jr. | 183/57 |
| 2,332,251 A | 10/1943 | Parrish | 51/14 |
| 2,372,316 A | 3/1945 | Curtis | 183/106 |
| 2,419,933 A | 5/1947 | Hutchins, Jr. | 51/14 |
| 2,432,757 A | 12/1947 | Weniger | 183/84 |
| 2,443,162 A | 6/1948 | Hallock | 183/54 |
| 2,453,951 A | 11/1948 | Vedder | 183/67 |
| 2,467,503 A | 4/1949 | Scriven | 183/51 |

(List continued on next page.)

FOREIGN PATENT DOCUMENTS

| | | |
|---|---|---|
| CA | 482388 | 4/1852 |
| GB | 205155 | 10/1923 |
| NL | 7308668 | 12/1974 |

*Primary Examiner*—Duane Smith
*Assistant Examiner*—Jason M. Greene
(74) *Attorney, Agent, or Firm*—Welsh & Katz, Ltd.; Thomas W. Tolpin (57) ABSTRACT

A specially arranged industrial dust collector with multiple filtering compartments is provided which is efficient, effective, and economical. The special industrial dust collector has a solids-gas separation compartment which is positioned generally alongside and laterally offset from multiple filtering compartments. The multiple filtering compartments can contain cartridge filters or other filters. The solids-gas separation compartment can contain a tangential cyclone separator or another type of solids-gas separator.

26 Claims, 3 Drawing Sheets

U.S. PATENT DOCUMENTS

| | | | |
|---|---|---|---|
| 2,496,180 A | 1/1950 | Smith et al. | 183/36 |
| 2,535,963 A | 12/1950 | Sisemore | 183/37 |
| 2,548,374 A | 4/1951 | Janson | 183/15 |
| 2,604,956 A | 7/1952 | Israel | 183/83 |
| 2,674,342 A | 4/1954 | Antonelli | 183/57 |
| 2,714,426 A | 8/1955 | White | 183/58 |
| 2,719,346 A | 10/1955 | Caciagli | 25/45 |
| 2,720,278 A | 10/1955 | Wiley | 183/67 |
| 2,778,445 A | 1/1957 | Brixius | 183/13 |
| 2,789,659 A | 4/1957 | Hemscheidt | 183/34 |
| 2,815,621 A | 12/1957 | Carter | 53/22 |
| 2,907,405 A | 10/1959 | Marshall | 183/41 |
| 2,916,104 A | 12/1959 | Hultberg et al. | 183/37 |
| 3,092,206 A | 6/1963 | Moreau | 181/68 |
| 3,113,635 A | 12/1963 | Allen et al. | 181/42 |
| 3,153,834 A | 10/1964 | Boyer et al. | 25/41 |
| 3,178,868 A | 4/1965 | Gibby | 55/96 |
| 3,267,890 A | 8/1966 | Zinn et al. | 110/18 |
| 3,308,609 A | 3/1967 | McCulloch et al. | 55/319 |
| 3,320,727 A | 5/1967 | Farley et al. | 55/337 |
| 3,411,748 A | 11/1968 | Fortune | 254/51 |
| 3,434,241 A | 3/1969 | Greenberg et al. | 51/14 |
| 3,440,763 A | 4/1969 | O'Brien | 49/280 |
| 3,485,671 A | 12/1969 | Stephens | 134/7 |
| 3,486,312 A | 12/1969 | Kline et al. | 55/363 |
| 3,499,269 A | 3/1970 | Bois | 55/309 |
| 3,541,631 A | 11/1970 | Kluge et al. | 15/340 |
| 3,577,705 A | 5/1971 | Sharlit | 55/4 |
| 3,618,302 A | 11/1971 | Cornett | 55/278 |
| 3,622,123 A | 11/1971 | Gloan | 254/2 R |
| 3,650,420 A | 3/1972 | Mahaney | 214/44 R |
| 3,653,190 A | 4/1972 | Lee et al. | 55/302 |
| 3,653,191 A | 4/1972 | Nelson et al. | 55/310 |
| 3,694,964 A | 10/1972 | Bowling, Jr. | 51/9 |
| 3,717,901 A | 2/1973 | Johnstone | 15/314 |
| 3,731,464 A | 5/1973 | Brumbaugh et al. | 55/270 |
| 3,738,089 A | 6/1973 | Brill | 55/310 |
| 3,751,881 A | 8/1973 | Hughes | 55/367 |
| 3,780,502 A | 12/1973 | Dupre et al. | 55/337 |
| 3,783,590 A | 1/1974 | Allen | 55/310 |
| 3,801,869 A | 4/1974 | Masuda | 317/3 |
| 3,802,163 A | 4/1974 | Riojas | 55/276 |
| 3,842,461 A * | 10/1974 | Wurster | 55/342 |
| 3,870,489 A | 3/1975 | Shaddock | 55/314 |
| 3,877,900 A | 4/1975 | Mitchell | 55/366 |
| 3,877,902 A | 4/1975 | Eriksson et al. | 55/337 |
| 3,902,455 A | 9/1975 | Lehmann et al. | 118/630 |
| 3,918,118 A | 11/1975 | vom Berg et al. | 15/83 |
| 3,921,336 A | 11/1975 | Nishio et al. | 51/9 R |
| 3,934,373 A | 1/1976 | Leliaert et al. | 51/9 M |
| 3,951,623 A | 4/1976 | Furstenberg | 55/96 |
| 3,955,236 A | 5/1976 | Mekelburg | 15/314 |
| 3,999,653 A | 12/1976 | Haigh et al. | 206/584 |
| 4,007,026 A | 2/1977 | Groh | 55/302 |
| 4,010,784 A | 3/1977 | Nattrass et al. | 150/1 |
| 4,036,614 A | 7/1977 | DeMarco | 55/310 |
| 4,062,664 A | 12/1977 | Dupre et al. | 55/319 |
| 4,099,937 A | 7/1978 | Ufken et al. | 55/212 |
| 4,111,670 A | 9/1978 | DeMarco | 55/315 |
| 4,133,658 A | 1/1979 | Callewyn | 55/315 |
| 4,223,748 A | 9/1980 | Barendsen | 175/66 |
| 4,224,043 A | 9/1980 | Dupre | 55/319 |
| 4,227,900 A * | 10/1980 | Nichols et al. | 55/302 |
| 4,229,193 A | 10/1980 | Miller | 55/318 |
| 4,272,258 A | 6/1981 | Shifflett | 55/52 |
| 4,303,417 A | 12/1981 | Koch, II | 55/96 |
| 4,328,014 A | 5/1982 | Burgoon et al. | 55/300 |
| 4,354,451 A | 10/1982 | Vohringer et al. | 118/326 |
| 4,361,985 A | 12/1982 | DeMarco | 49/280 |
| 4,367,080 A | 1/1983 | Kordas | 55/302 |
| 4,375,487 A | 3/1983 | Huber | 427/195 |
| 4,378,728 A | 4/1983 | Berkmann | 98/115 |
| 4,401,445 A | 8/1983 | Browning | 55/96 |
| 4,409,009 A * | 10/1983 | Lissy | 55/302 |
| 4,443,235 A | 4/1984 | Bernholt et al. | 55/218 |
| 4,467,494 A | 8/1984 | Jones | 15/353 |
| 4,475,934 A | 10/1984 | Kordas | 55/302 |
| 4,504,292 A | 3/1985 | Vohringer | 55/325 |
| 4,533,370 A | 8/1985 | Ikezaki et al. | 55/276 |
| 4,541,846 A | 9/1985 | Sjodin | 88/97 |
| 4,559,067 A | 12/1985 | Durston | 55/324 |
| 4,578,840 A | 4/1986 | Pausch | 15/340 |
| 4,581,050 A | 4/1986 | Krantz | 55/269 |
| 4,628,689 A | 12/1986 | Jourdan | 60/295 |
| 4,695,299 A | 9/1987 | Spadaro et al. | 55/274 |
| 4,698,077 A * | 10/1987 | Peltola | 55/345 |
| 4,703,782 A | 11/1987 | Henkel, Sr. | 141/65 |
| 4,715,872 A | 12/1987 | Snyder | 55/315 |
| 4,718,924 A | 1/1988 | DeMarco | 55/302 |
| 4,718,925 A | 1/1988 | DeMarco | 55/367 |
| 4,723,969 A | 2/1988 | DeMarco | 55/97 |
| 4,735,639 A | 4/1988 | Johnstone | 55/302 |
| 4,749,391 A | 6/1988 | DeMarco | 55/367 |
| 4,786,299 A * | 11/1988 | DeMarco | 55/337 |
| 4,790,865 A * | 12/1988 | DeMarco | 55/337 |
| 4,820,315 A | 4/1989 | DeMarco | 55/1 |
| 4,869,737 A | 9/1989 | Parenti | 55/213 |
| 4,963,172 A | 10/1990 | DeMarco | 55/429 |
| 5,064,454 A * | 11/1991 | Pittman | 55/302 |
| 5,078,760 A * | 1/1992 | Haldipur | 55/337 |
| 5,135,611 A * | 8/1992 | Cameron | 55/526 |
| 5,180,407 A * | 1/1993 | DeMarco | 55/337 |

* cited by examiner

INDUSTRIAL DUST COLLECTOR WITH MULTIPLE FILTER COMPARTMENTS

BACKGROUND OF THE INVENTION

This invention pertains to machines for removing dry and wet liquid particulates, and more particularly, to an industrial vacuum cleaner loader or conveyor.

In industry, voluminous amounts of particulate matter, debris, and waste are emitted during machining, foundry, milling, shipment, warehousing, assembling, fabricating, and other manufacturing operations. Particulates of dust emitted during a manufacturing operation can include metal slivers, plastic chips, wood shavings, dirt, sand, and other debris. Dust accumulates on floors, machines, packaging materials, equipment, food and personnel. Dust is carried and circulated in the air and can be injurious to the health and safety of operating personnel and other on site employees. Dust can damage, erode, and adversely effect the efficiency and operability of equipment. It can also create a fire hazard and cause explosions in some situations, such as in grain elevators. Voluminous amounts of dust can pollute the atmosphere. Dust may also impair the quality of the products manufactured.

Dust emissions are not only dangerous and troublesome, but are particularly aggravating and grievous where relatively dust-free conditions and sterile environments are required, such as in medical supply houses, the electronics industry, and in food-processing plants.

Over the years a variety of industrial dust collectors and other equipment have been suggested for removing industrial dust and debris and for other purposes. These prior art dust collectors and equipment have met with varying degrees of success.

It is, therefore, desirable to provide an improved industrial dust collector which overcomes most, if not all, of the preceding problems.

SUMMARY OF THE INVENTION

An improved industrial dust collector with multiple filter compartments or with multiple filters positioned about one or more solids-gas separators, is provided to remove airborne as well as settled particulate matter, debris and waste from industrial plants and other locations. Advantageously, the novel industrial dust collector with multiple filter compartments is efficient, effective, and safe. Desirably, the user-friendly industrial dust collector with multiple filter compartments can also be movable, portable, or towable, and can be used in a stationary manner. The industrial dust collector with multiple filter compartments can accommodate standard and different size bins and hoppers. Furthermore, the multiple use industrial dust collector with multiple filter compartments provides a superb industrial vacuum cleaner, vacuum loader, and conveyor.

The industrial dust collector with multiple filter compartments has a solids-gas separating (separation) compartment which contains a solid-gas separator to effectively remove large particulates of dust from a dusty gas stream. In the preferred form, the solids-gas separator can comprise a tangential cyclone separator. The solids-gas separator can also comprise a barrier wall portion comprising an impact plate separator (strike plate). Desirably, the tangential cyclone separator and the impact plate separator comprise a deflector(s) which changes the direction of flow of the incoming dusty gas stream. At least one inlet conduit is connected to the solids-gas separating compartment to feed the influent dusty gas stream to the solids-gas separating compartment.

Preferably, the industrial dust collector has two or more filter compartments which are positioned about one or more solids-gas separating compartments. In some circumstances, it may be desirable to have an array, series or plurality of filters positioned concentrically, eccentrically or about one or more solids-gas separating compartments and in such circumstances, the filter can be arranged in a single annular filter compartment or in an array, series, or set of filter compartments.

In the preferred form, a first filter (filtering) compartment can be positioned generally along side and spaced laterally away from the solids-gas separating compartment and in offset relationship thereto, rather than vertical alignment or completely above the solids-gas separation compartment. The first filtering compartment has at least one first filter to filter a first portion of the dusty gas stream. At least one first compressed air tank communicates with the first filtering compartment. Also, at least one first air injector is operatively connected to the first compressed air tank to inject compressed air with sufficient kinetic energy into the first filter in the first filtering compartment to help clean the first filter. A first intermediate conduit can be provided to pass a portion of the dusty gas stream exiting the solids-gas separating compartment to the first filtering compartment. A first discharge conduit can be connected to the first filtering compartment to discharge the filtered first portion of the dusty gas stream from the first filtering compartment.

In the novel industrial dust collector with multiple filter compartments, a second filter (filtering) compartment can be positioned generally along side and spaced laterally away from the solids-gas separation compartment and in offset relationship thereto, rather than in vertical alignment or completely above the solids-gas separation compartment. Desirably, the second filtering compartment is spaced laterally away from the first filtering compartment. In the preferred form, the solids-gas separating compartment is spaced between and separates the first filtering compartment and the second filtering compartment. The second filtering compartment has at least one second filter to filter a second portion of the dusty gas stream. At least one second compressed air tank communicates the second filtering compartment. Furthermore, at least one second injector is operatively connected to the second compressed air tank to inject compressed air with sufficient kinetic energy into the second filter in the second filtering compartment to help clean the second filter. A second intermediate conduit can be provided to pass the second portion of the dusty gas stream exiting the solids-gas separation compartment to the second filtering department. A second discharge outlet conduit can be connected to the second filtering department to discharge the filtered second portion of the dusty gas stream from the second filtering compartment.

The novel industrial dust collector with multiple filter compartments can also include a third filter (filtering) compartment or more filter (filtering) compartments which can be positioned generally along side and spaced laterally away form the solids-gas separating compartment and in offset relationship thereto, rather than in vertical alignment or completely above the solids-gas separating compartment. Desirably, the third filtering compartment is spaced laterally away from both the first filtering compartment and the second filtering compartment. In the preferred form, the solids-gas separating compartment is spaced between and separates the first filtering compartment and the third filtering compartment. At least one third compressed air tank communicates with the third filtering compartment. Also, at least one third air injector is operatively connected to the third compressed air tank to inject compressed air with sufficient kinetic energy into the third filter in the third filtering compartment to help clean the third filter. A third intermediate conduit can be provided to pass the third portion of the dusty gas stream exiting the solids-gas separation compartment to the third filtering compartment. A third discharge outlet conduit can be connected to the third filtering compartment to discharge the third filtered portion of the dusty gas stream to the third filtering compartment.

In the preferred form, a hopper comprising a bin is positioned below and supports the solids-gas separation compartment and the multiple filter compartments. A vacuum pump can be connected to a motor to draw (suck) influent dusty air through the inlet conduit(s) into the solids-gas separating compartment. Preferably, a sound attenuating device comprising a muffler is provided to dampen noise emitted from the motor and pump.

The industrial dust collector with multiple filter compartments provides for kinetic separation of particulate matter from an air stream. The solids-gas separator provides a kinetic pre-separator prior to the final filtration in the multiple filter compartments with cartridge filters (tubular filters) or other types of filters. The industrial dust collector can have two, three or more filter compartments (filter housings). Preferably, at least two of the filter compartments are laterally spaced from and in offset relationship to the solids-gas separation compartment.

Advantageously, multiple filter compartments achieve greater efficiency in the separation of particulate matter from dusty air streams. This may be attributable to greater angular kinetic separation of the particulates along the perimeter or circumference of the tangential cyclone separator or other solids-gas separator. It is believed that the greater the angular coverage or offset of the multiple filter compartments (filtration housings) around the solids-gas separators, the more efficient the gross cut separation of the larger particulates by the solids-gas separator will be. Furthermore, the multiple filter compartments provide for greater filtration, dedusting, and purification of the dusty gas stream to provide for cleaner emissions and better compliance with environmental laws and regulations.

In the illustrated embodiment, at least one of the filters in the multiple filter compartments comprises a tubular filter (cartridge filter or canister filter). At least one of the compressed air tanks can comprise an upright compressed air tank that is positioned in proximity to the tubular filter. In some circumstances, it may be desirable to use one or more other types of filters, such as a Hepa-type filter, a bag-type filter, box-type filter, envelope filter, flat filter, or conical filter. More specifically, each of the filtering compartments can have a filtering chamber containing at least one filter, such as a cartridge filter (canister with a tubular filter therein), a Hepa-type filter, a bag-type filter, a box-type filter, an envelope filter, a flat filter, a conical filter, or a set of 2 to 4 or more of the preceding filters. Furthermore, each of the filtering compartments can have an acceleration or kinetic energy chamber to accelerate and/or pass the dusty gas stream with sufficient kinetic energy to remove a substantial amount of particulate of dust from the dusty gas stream before the dusty gas stream enters and passes through the filter(s). The filtering compartment can have nozzle, tubes, or ports, to inject the dusty gas stream into the acceleration chamber. One or more air injectors, shakers, vibrators, or other filter cleaning devices can be provided to periodically clean the filters. In the preferred from, the filtering chamber has a power-operated discharge door to discharge the dust into the bin or hopper. In the illustrative embodiment, the separated and filtered particulates from the dusty air stream are discharged, collected and settled in the collection compartment of a hopper or bin positioned below the solids-gas separation and multiple filter compartments.

As used in this Patent Application, the term "dust" means particulate matter, solids, debris and waste.

The terms "dedust" and "dedusted" as used herein means removing a substantial amount of dust.

A more detailed explanation of the invention is provided in the following description and appended claims taken in conjunction with the accompanying drawings.

DETAILED DESCRIPTION OF THE PREFERRED EMBODIMENTS

An industrial dust collector 10 (FIGS. 1–3) with multiple filter compartments or with multiple filters positioned about one or more solids-gas separators, provides a heavy-duty vacuum-operated machine, industrial vacuum cleaner, vacuum loader and conveyor for efficiently removing, effectively collecting, and safely disposing of particulate matter, debris, and waste. The industrial dust collector can be made of steel or other metal. Other materials can be used.

The industrial dust collector 10 can have a frame assembly 12 with a base 14 which provides a support platform. The frame assembly can have a cradle 16 (FIGS. 2 and 3) for receiving a hopper 18 comprising a bin such as an end dump hopper. The frame assembly and hopper can be equipped with forklift-channels 20 and 22 (FIG. 3) for receiving and being moved by tines of a forklift truck. The frame assembly can have support members or skids 24 (FIG. 2) with a coupling 26 or tow bar 27 for coupling and attachment to a railway car, truck or other vehicle. Pneumatically-operated expansion bellows can be positioned on bellows support pads of the frame assembly to move the top of the bin flush into sealing engagement against a gasket or seal on the underside of the support platform. Wheels 28–30 (FIGS. 2 and 3) or casters can be mounted on the underside of the base to enable the frame assembly and industrial dust collector to be mobile, portable, moveable, and towable.

The bottom portion of the bin can have a discharge door or valve 32 (FIG. 2) which comprises a slidable (slide) base to discharge the contents in the bin comprising the removed, settled, and collected particulates of dust. The discharge door or valve can be power driven and can be opened and closed by chains 34 and 35 and pulleys 36–39.

A vacuum pump 40 (FIG. 1), compressor, air blower, turbine, or fan and electric motor 42 can be mounted on a support surface 43 or support platform. The vacuum pump (air blower) is operatively connected to and driven by the motor such as by drive belts. The vacuum pump creates a vacuum (suction) to draw dust and direct influent dusty air (air laden with particulates of dust) comprising the dusty gas stream through one or more inlet conduits, such as through a primary inlet conduit 44 and a secondary inlet conduit 46, which provide material inlet ports into a solids-gas separation (separating) compartment 48. In the illustrative embodiment, the dual inlet conduits 44 and 46 are parallel and in offset relationship to each other and are tangential to the solids-gas separation compartment and the solids-gas separator 50 contained therein. The dual inlet conduits direct the flow of the influent dusty gas streams inwardly and in opposing (opposite) directions to create a turbulent or swirling action of the dusty gas streams in the solids-gas separation compartment. The air blower can be connected by an overhead blower line 52 which communicates with discharge outlet conduits (outlets) 54–56 of the upper chambers (upper portions) of the filter (filtering) compartments 58–60 (filter housings). The air blower can also be connected to an exhaust pipe 62 to provide a blower discharge outlet and exhaust to emit the dedusted purified clean gas stream (air) to the surrounding area or atmosphere.

A sound attenuating device 64 (FIG. 2) comprising a muffler with an upright overhead intake 66 can be connected to the air blower and the exhaust pipe to attenuate, muffle, suppress, and decrease noise and vibrations from the air blower (vacuum pump) and motor, and dampen the noise and sound of the purified gases passing and being discharged through the exhaust pipe. An automatic shutoff control panel 68 (FIG. 1) can be mounted on the support platform and connected to a sensor and limit switch in the bin to automatically shut off the air blower or motor when the discharged collected dust in the bin has reached a preselected level. A flexible, elongated intake hose, with an optional nozzle, can be connected to the intake conduit to facilitate collection of the particulate material.

Figure 1:
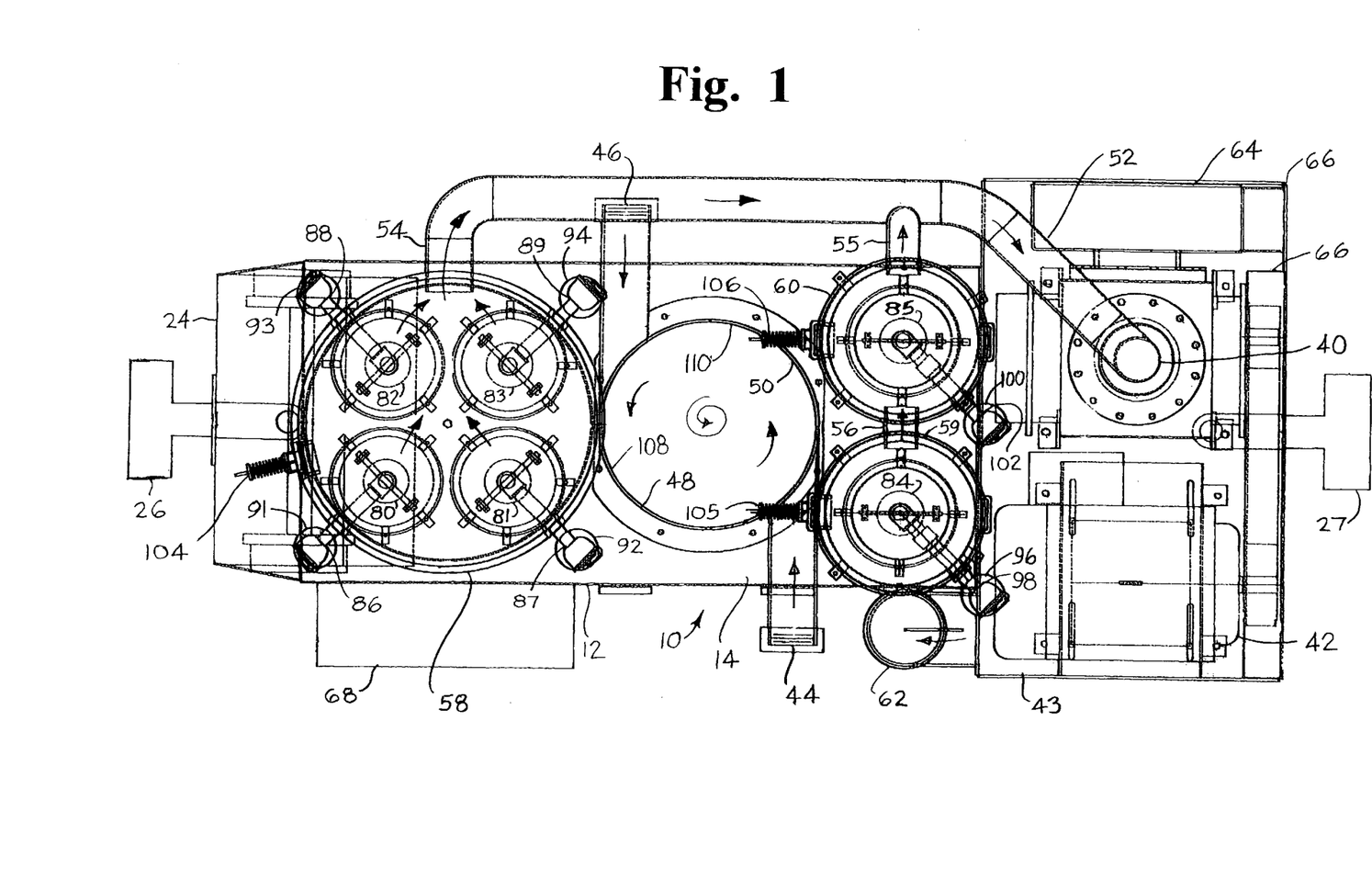
FIG. 1 is a top plan view of an industrial dust collector with multiple filter compartments in accordance with principles of the present invention.
Figure 2:
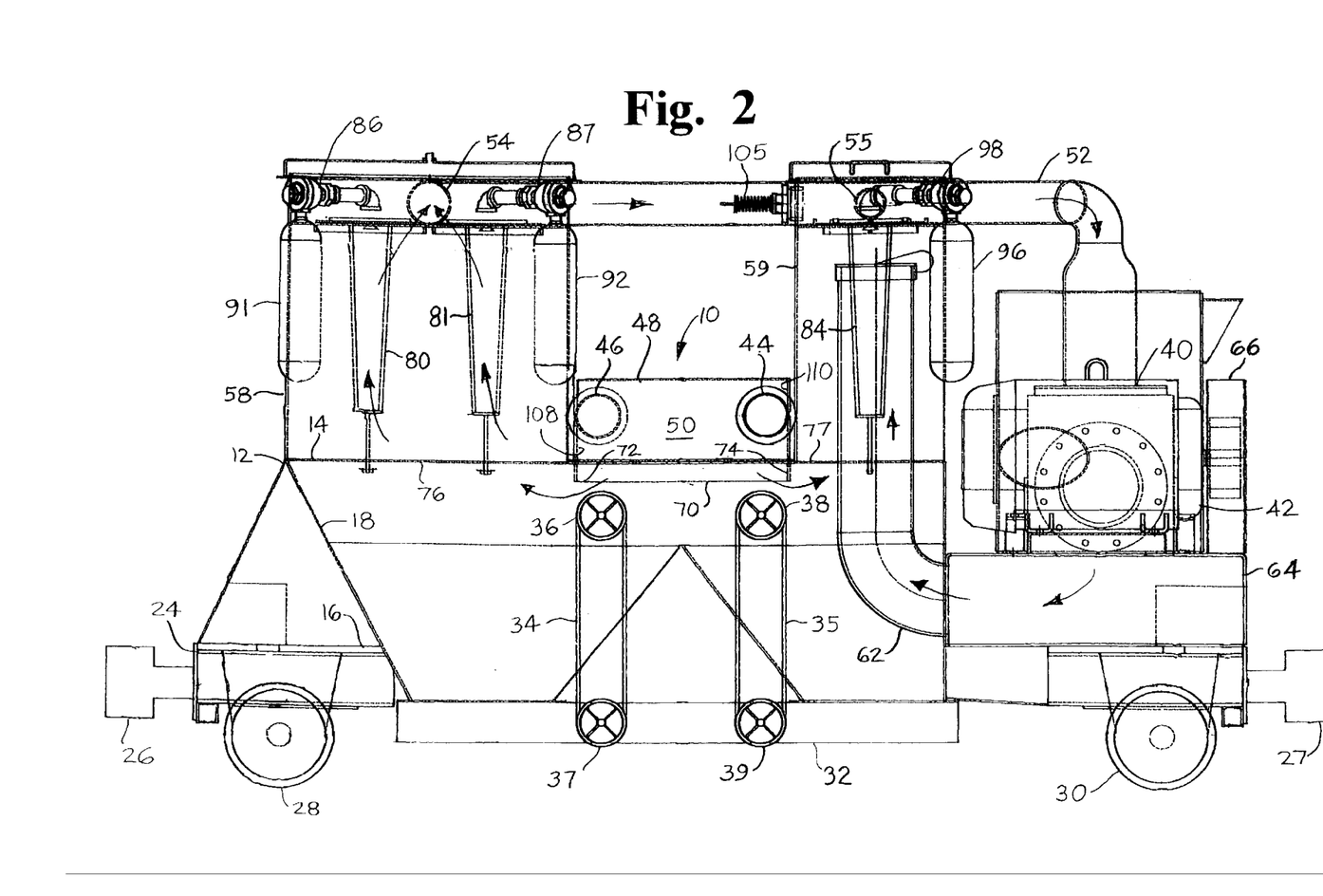
FIG. 2 is a front view of the industrial dust collector with multiple filter compartments.
Figure 3:
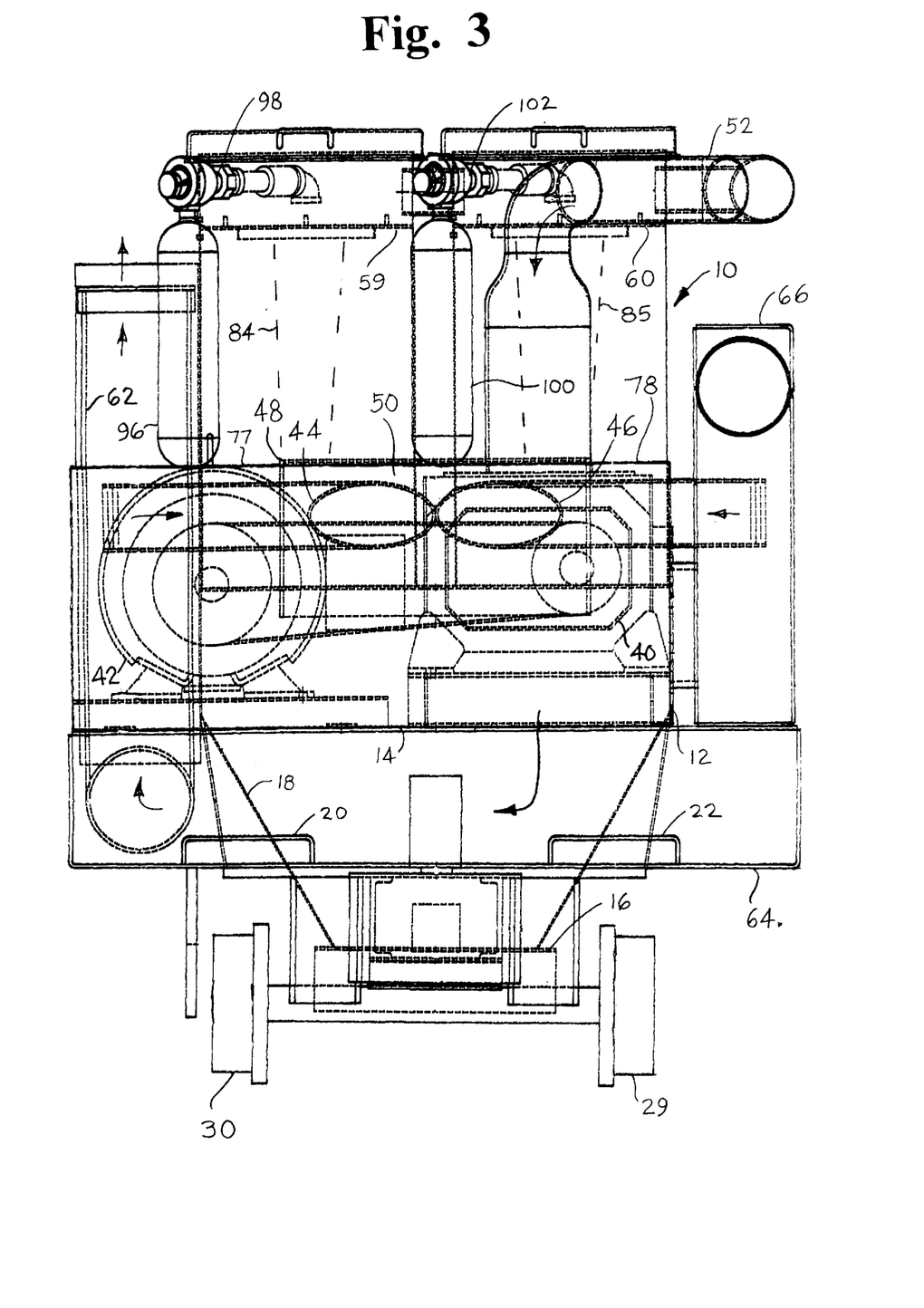
FIG. 3 is a side view of the industrial dust collector with multiple filter compartments.

The solids-gas separation compartment 48 (FIG. 2) contains one or more solids-gas separators, preferably comprising tangential cyclone separator 50 with an open bottom 70 providing a circular or circumferential bottom outlet 72 about its circular edge and periphery 74 to discharge larger particulates of dust into the bin. The partially dedusted gas stream can exit the solids-gas separating compartment through the bottom outlet of the solids-gas separating compartment and pass (flow) upwardly through the open bottoms (filter compartment-inlets) 76–78 (FIGS. 2 and 3) of the filter compartments 58–60. The partially dedusted gas stream of air can pass (flow) upwardly and be filtered by filters 80–85 (FIG. 1) in the filter compartments 58–60 to remove most of the remaining smaller particulates (fines) of dust in the dusty stream. The filtered dedusted air can pass (flow) upwardly and exit and be discharged from the filter compartments through outlets 54–56 (FIG. 1). The filtered air can be drawn through the blower line 52 by the vacuum pump (blower) and can be discharged to the surrounding area and atmosphere by the exhaust pipe 62 (FIG. 2).

The open bottoms of the filter compartments can provide filter discharge openings to discharge the filtered and removed particulates of dust (fines) into the bin. The filter (filtering) compartments can have horizontal floors comprising normally closed, power-operated, discharge hatches, flaps, or doors which can be mounted on rollers and connected by suitable air or hydraulic cylinders powered by external compressed air tanks or hydraulic pumps.

The first filter compartment 58 can have a first filter chamber that contains a plurality, set, or array of canister filters (annular filters or cartridge filters) 80–84 (FIG. 1). The partially dedusted gas stream can flow upwardly, annularly, and laterally through each filter of the first filter compartment to remove substantially all the remaining particulates of dust. In the illustrative embodiment, the first filter compartment contains a set of four canister filters 80–83 which are positioned in a circular array. Each of the canister filters can contain a vertically V-shaped retainer. While the preceding arrangement is preferred for best results, more or less filters or different types of filters can be used, if desired. The set of first filters 80–83 in the first filter compartment remove the fines (minute fine dust particles) and substantially all the remaining particulates of dust in the dusty gas stream flowing through the first filter compartment to produce a dedusted purified gas (air) stream.

A discharge outlet conduit (FIG. 1) is connected to and communicates with the upper clean air chamber (plenum) of the first filtering (filter) compartment to provide an outlet and passageway through which the purified, dedusted and filtered air is drawn from the first filtering compartment via the blower line 52 into the vacuum suction pump (air blower) and muffler for discharge via the exhaust pipe to the atmosphere or area surrounding the industrial dust collector.

Reverse pulse filter cleaners comprising air injectors 86–89 (FIGS. 1 and 2) can be mounted and extend to the interior of the upper air chamber of the first filtering compartment to periodically inject intermittent blasts comprising pulses of compressed clean air upon the inside (interior) of the filters to help clean the filters. The injectors can be connected by pneumatic tubes or conduits to an air supply source, such as compressed air tanks comprising compressed air canisters, or an auxiliary compressor. In the illustrative embodiment, there is a circular array or set of four upright compressed air canisters (compressed air tanks) 91–94 (FIGS. 1 and 2) mounted about the exterior surface of the cylindrical upright wall of the first filtering compartment and there is a circular set or array of four downwardly facing, overhead air injectors positioned above the centers of the filters and connected to the compressed air canisters to sequentially inject pulses of compressed air into the center of the tubular filters to shake loose the dust collected, accumulated, or the outside of the filter walls. More or less air injectors and compressed air canisters can be used. While the illustrated arrangement is preferred for best results, a different shaped array or orientation of air injectors and/or air canisters (compressed air tanks) can be used, if desired. The filtered removed dust collected and accumulated on the bottom of the first filtering (filter) compartment can be discharged into the bin when the blower is turned off or by actuation of the control panel and/or when the discharge door or bottom of the first filter compartment is open.

As described previously, the industrial dust collector with multiple filter (filtering) compartments provides an effective industrial vacuum cleaner, vacuum loader and conveyor. The industrial dust collector with multiple filter compartments has at least one solids-gas separation (separating) compartment containing at least one solids-gas separator. Desirably, the solids-gas separator provides gross separation to remove large particulates (particles) of dust from an influent dusty gas stream (e.g. dust laden air) to attain a grossly separated effluent dusty stream having a lower concentration of particulates of dust by weight than the influent dusty stream, Preferably, the solids-gas separator comprises a tangential cyclone separator. The tangential cyclone separator provide an offset deflector cyclone for kinetic separation of material from the influent dusty stream (air flow). The solids-gas separator can also have a barrier wall portion comprising an impact plate. The solids-gas separating compartment has an inlet conduit (intake) to feed the influent dusty stream to the tangential cyclone separator. The solids-gas separating compartment also has a separator-outlet (exit) conduit to discharge the partially dedusted, grossly separated, effluent dusty stream from the solids-gas separating compartment.

The industrial dust collector with multiple filter (filtering) compartments preferably has two or more filter (filtering) compartments, including a first filter (filtering) compartment with a first filtering chamber. The first filtering chamber preferably contains a set of first tubular filters (cartridges or canisters) to filter smaller particulates of dust from a first portion of the grossly separated effluent dusty stream from the solids-gas separating compartment to provide a first filtered stream having a lower concentration of particulates of dust by weight than the grossly separated effluent dusty stream. A set of first compressed air tanks communicates with the first filtering compartment. Desirably, an array, set or series of first air injectors are operatively connected to the first compressed air tanks to intermittently inject pulses or blasts of compressed air with sufficient kinetic energy to the set of first filters in the first filtering compartment to help clean the set of first filters in the first filtering compartment. Advantageously, the first filtering compartment is positioned generally along side and is spaced laterally away from the solids-gas separating (separation) compartment and in offset relationship thereto, rather than in vertical alignment or completely above the solids-gas separating compartment. A first intermediate conduit can communicate with the separator-outlet conduit and the first filter (filtering) compartment to pass the first portion of the grossly separated effluent dusty stream from the solids-gas separating compartment to the first filtering compartment. A first discharge (outlet) conduit 54 (FIG. 1) can be provided to discharge the first filtered stream from the first filtering compartment.

The industrial dust collector with multiple filter compartments can have a second filter (filtering) compartment 59 (FIGS. 1 and 2) containing at least one second filter 84 to filter smaller particulates of dust from a second portion of the grossly separated effluent dusty stream from the solids-gas separating (separation) compartment to provide a second filtered stream having a lower concentration of particulates (particles) of dust by weight than the grossly separated effluent dusty stream. Desirably, at least one second compressed air tank 96 (FIGS. 1–3) comprising a compressed air canister communicates with the second filtering compartment. Also, at least one second air injector 98 is operatively connected to the second compressed air tank to intermittently inject pulses or blasts of compressed air with sufficient kinetic energy to the second filter in the second filtering compartment to help clean the second filter in the second filtering compartment. Desirably, the second filtering compartment is positioned generally along side and spaced laterally away from the solids-gas separating compartment and in offset relationship thereto, rather than in vertical alignment or completely above the solids-gas separating compartment. Preferably, the second filter (filtering) compartment is also spaced laterally away from the first filter (filtering) compartment, rather than in vertical alignment with the first filter compartment or positioned completely above the first filter compartment. In the preferred embodiment, the solids-gas separating compartment is positioned and spaced between and separates the first filtering compartment and the second filtering compartment. A second intermediate conduit can communicate with the separator-outlet conduit and the second filtering compartment to pass the second portion of the grossly separated effluent dusty stream from the solids-gas separating compartment to the second filtering compartment. A second discharge (outlet) conduit 56 (FIG. 1) can be provided to discharge the second filtered stream from the second filtering compartment.

The industrial dust collector with multiple filter compartments can also have a third filtering compartment 60 (FIG. 1) containing at least one third filter 85 to filter smaller particulates of dust from a third portion of the grossly separated effluent dusty stream from the solids-gas separating compartment to provide a third filtered stream having a lower concentration of particulates (particles) of dust by weight than the grossly separated effluent dusty stream. At least one third compressed air tank 100 (FIGS. 1 and 3) comprising a compressed air canister, communicates with the third filtering compartment. Desirably, at least one third air injector 102 is operatively connected to the third compressed air tank to intermittently inject pulses or blasts of compressed air with sufficient kinetic energy to the third filter in the third filtering compartment to help clean the third filter in the third filtering compartment. Advantageously, the third filter (filtering) compartment is positioned generally along side and is spaced laterally away from the solids-gas separating compartment and in offset relationship thereto, rather than in vertical alignment or completely above the solids-gas separating compartment. Advantageously, the third filtering compartment is spaced laterally away from the first filtering compartment rather than in vertical alignment with the third filtering compartment or positioned completely above the first filtering compartment. Preferably, the third filtering compartment is also spaced laterally away from the second filtering compartment rather than in vertical alignment with the second filtering compartment or positioned completely above the second filtering compartment. In the preferred embodiment, the solids-gas separating compartment is positioned and spaced between and separates the first filtering compartment and the third filtering compartment. Also, in the illustrative embodiment, the second filtering compartment is positioned generally along side the third filtering compartment. Furthermore, the first filtering compartment can comprise sections or portions which are diametrically opposite or opposed to sections or portions of the second filtering compartment and the third filtering compartment. A third intermediate conduit 56 (FIG. 1) can communicate with the separator-outlet conduit and the third filtering compartment to pass the third portion of the grossly separated dusty stream from the solids-gas separating compartment to the third filtering compartment. A third discharge (outlet) conduit 55 (FIG. 1) can be provided to discharge the third filtered stream from the third filtering compartment.

In the illustrative embodiment, the blower line 52 (FIG. 1) extends between, connects, and communicates with the first and third outlet conduits 54 and 55 of the first and third filter compartments. Also, the third intermediate conduit 56 (FIG. 1) extends between and communicates with the second and third filtering compartments. The third intermediate conduit 56 can also comprise or be integral with the second discharge conduit so that the third portion of the grossly separated effluent dusty stream also comprises the second filtered stream. Each of the multiple filter (filtering) compartments can have a pressure (vacuum) relief valve 104, 105, or 106 (FIG. 1).

In the preferred embodiment, the air injectors are positioned at an elevation above the filters, pump, motor, and tangential cyclone separator. The second filter in the second filtering compartment can comprise a tubular filter (cartridge filter or canister filter). Furthermore, the third filter in the third filtering compartment can also comprise a tubular filter (cartridge filter or canister filter). While tubular filters are preferred for more effective filtering, in some circumstances it may be desirable to use one or more other types of filters, such as Hepa-type filters, bag-type filters, box-type filters, envelope filters, flat filters, or conical filters. Moreover, it may be desirable to have more than one filter in the second filter (filtering) compartment and in the third filter (filtering) compartment. Also, while the preferred embodiment has three separate filter (filtering) compartments, in some circumstances it may be desirable to have two filter (filtering) compartments or more than three filter (filtering) compartments or an array, series, set, or plurality of filters positioned concentrically, eccentrically, or about one or more solids-gas separating compartments, either in a single annular filter compartment or in an array, series, set, or plurality of filter compartments.

In the preferred embodiment, the hopper comprising a bin is positioned below and supports the solids-gas separating (separation) compartment, as well as supports the first, second and third filtering compartments. The bin has a collection compartment or chamber to receive and collect the large particulates of dust removed by the solids-gas separator and the smaller particulates (fines) removed by the filters of the multiple filter compartments. The bin can comprise a stationary bin, a moveable bin, a portable bin, and/or a towable bin. Preferably, the bin has a lower portion with a power-operated slideable door 32 (FIG. 2) to discharge the collected particulates (particles) of dust from the bin.

In the illustrative embodiment, the motor 42 (FIG. 1) is positioned in proximity to the second filter (filtering) compartment. Preferably, the second filter (filtering) compartment is disposed and positioned between the solids-gas separating compartment and the motor. The vacuum pump (blower) can be operatively connected to the motor to draw the influent dusty stream through one or more inlet conduits 44 and 46 (FIGS. 1–3) into the solids-gas separating compartment. Preferably, the vacuum pump is positioned in proximity to the third filtering compartment. In the illustrative embodiment, the third filtering compartment is disposed and positioned between the solids-gas separating compartment and the vacuum pump. A base providing a support surface can be provided to support the vacuum pump and motor. Preferably, the base comprises and/or also supports a sound attenuating device which provides a muffler to dampen noise emitted from the motor and pump.

In operation, air laden with entrained particulates of debris, waste and other dust is drawn by the blower through the dual intake conduits 44 and 46 (FIGS. 1–3) into the tangential cyclone separator 50 in the solids-gas separation compartment 48. The tangential cyclone separator (cyclone) swirls the dusty air tangentially along the inside surface of the gas-solids separation compartment and ejects the effluent partially dedusted air upwardly into the multiple filter compartments. The removed particulates are discharged by gravity downwardly into the bin through the bottom outlet of the solids-gas separation compartment.

The partially dedusted, grossly separated dusty air can exit from the bottom edge of the tangential cyclone separator and pass upwardly through the multiple filter compartments comprising the first, second, and third filter (filtering) compartments. The filters in the multiple filter compartments remove most of the remaining small particulates comprising fine particles (fines) of dust from the dusty stream to provide a purified, dedusted stream of cleaner air which is drawn through the blower line by the air blower (vacuum pump) and is discharged through the outlet stack comprising the exhaust pipe. The air injectors cooperate with the compressed air tanks for intermittent reverse air-pulse cleaning of the filters in the multiple filter compartments while vacuuming during operation of the industrial dust collector. The collected filtered fine particles of dust (fines) are discharged through the open bottoms of the multiple filter compartments into the bin.

The industrial dust collector provides a heavy duty, vacuum operated machine, industrial vacuum cleaner, vacuum loader, and conveyor to efficiently remove, effectively collect, and safely dispose of particulate matter, debris, and waste. The tangential cyclone separator makes a gross cut and partially dedusts the dusty influent air, gas and/or liquid. The tangential cyclone separator can be orientated and arranged to direct and blow the dusty air, gas and/or liquid counterclockwise or clockwise, so that the dusty air, gas and/or liquid flows downwardly through the solids gas separation compartment, laterally through the upper portion of the bin or hopper, and upwardly through the multiple filtering compartments. Instead of or in addition to the tangential cyclone separator, the solids-gas separator can comprise a curved barrier wall 108 (FIG. 1) or angled impact plate separator 110 (strike plate). The tangential cyclone separator, curved barrier wall, and impact plate separator all provide a deflector(s) comprising an impingement surface(s) which changes the direction of the incoming dusty gas stream and grossly separates and removes the larger particulates of dust from the influent dusty gas stream.

As discussed previously, in the preferred embodiment, the first filtering compartment or filter compartment is positioned along side and spaced laterally rearwardly and away from the solids-gas separation compartment and in offset relationship thereto, as is the second and third filtering compartments, rather than vertically above the solids-gas separation compartment. The open bottom portion of the filtering compartments can provide inlets opening for entrance of the partially dedusted stream of air, gas and/or liquid from the tangential cyclone separator. The lower portion and annular outer portion of each of the filtering compartments can provide an acceleration or kinetic chamber which accelerates and/or passes the dusty air and/or liquid upwardly with sufficient kinetic energy to remove a substantial amount of particulates of dust from the dusty air and/or liquid before the dusty air and/or liquid enters and passes through the filter(s) in the filter chambers of the multiple filtering compartments.

As previously described, the inner central portion of the first filtering (filter) compartment provides a first filter chamber that can contain at least one filter to filter, dedust, and remove substantially all of the remaining particulates of dust in the upwardly flowing stream of dusty air and/or liquid in the first filtering compartment. The first filtering compartment can contain a concentric set or series of tubular filters (canister filters). The first filtering compartment can have a set or series of four air injectors which are connected by compressed air lines or conduits to compressed air tanks to sequentially inject intermittent pulses of air on the filters to clean the set of first filters. In some circumstances, it may be desirable to use other types of filter cleaning equipment, such as mechanical shakers and vibrators, or more or less filters.

The multiple filter (filtering) compartments can have one or more Hepa-type filters, bag-type filters, or box-type filters instead of one or more tubular filters (canister filters) contained therein. The Hepa-type filters, bag-type filters, box-type filters, envelope filters, flat filters, or conical filters, substantially filter, dedust, and remove substantially all of the remaining particulates of dust from the upwardly moving stream of dusty air and/or liquid in the multiple filtering compartments. If desired, more than one Hepa-type filter, bag-type filter, box-type filter, envelope filter, flat filter, or conical filter, can be used. Other types of filters can also be used.

It has been unexpectedly and surprisingly found that in many situations the industrial dust collectors with multiple filtering compartments provided unexpected, surprisingly good results efficiently removing greater quantities of dust.

Among the many advantages of the industrial dust collectors with multiple filtering compartments are:
1. Improved removal of particulate matter, debris and waste.
2. Better solids-gas separation.
3. Enhanced air purification.
4. Excellent dedusting.
5. Greater efficiency of operation.
6. More economical to manufacture and operate.
7. Superior performance.
8. Easy to use.
9. Effective.
10. Quieter operation.
11. Lateral and/or upward flow of air into filters.
12. Easy to repair.
13. Less maintenance.
14. Flexibility and better adaptability for moveable, towable, portable and stationary operations.

Although embodiments of the invention have been shown and described, it is to be understood that various modifications and substitutions, as well as rearrangements of parts and process steps, can be made by those skilled in the art without departing from the novel spirit and scope of this invention.

What is claimed is:

1. An industrial dust collector, comprising:

at least one solids-gas separating compartment comprising at least one solids-gas separator for removing large particulates of dust from a dusty gas stream to provide a partially dedusted gas stream;

at least one inlet conduit connected to said solids-gas separating compartment for feeding said dusty gas stream to said solids-gas separating compartment;

simultaneously operating multiple filter compartments comprising at least a first filtering compartment and a second filtering compartment, said filtering compartment cooperating with each other and operating and filtering at the same time in the absence of purging and cleaning filters therein for filtering said partially dedusted gas stream from said solids-gas separating compartment;

said first filtering compartment positioned generally along side and spaced laterally away from said solids-gas separation compartment and in offset relationship thereto, rather than in vertical alignment or completely above said solids-gas separation compartment, said first filtering compartment having at least one first filter for filtering a first portion of said partially dedusted gas stream, at least one first compressed air tank communicating with said first filtering compartment, and at least one first air injector operatively connected to said first compressed air tank for injecting compressed air with sufficient kinetic energy into said filter in said first filtering compartment to help clean said first filter in said first filtering compartment;

a first discharge outlet conduit connected to said first filtering compartment for discharging said filtered first portion of said partially dedusted gas stream from said first filtering compartment;

said second filtering compartment positioned generally along side and spaced laterally away from said solids-gas separation compartment and in offset relationship thereto, rather than in vertical alignment or completely above said solids-gas separation compartment, said second filtering compartment being spaced laterally away from said first filtering compartment rather in vertical alignment therewith, said second filtering compartment cooperating with said first filtering compartment and simultaneously filtering said partially dusted gas stream with said first filtering compartment, said second filtering compartment having at least one second filter for filtering a second portion of said partially dedusted gas stream, at least one second compressed air tank communicating with said second filtering compartments, and at least one second air injector operatively connected to said second compressed air tank for injecting compressed air with sufficient kinetic energy into said second filter in said second filtering compartment;

a second discharge outlet conduit connected to said second filtering compartment for discharging said filtered second portion of said partially dedusted gas stream from said second filtering compartment;

a hopper comprising a bin positioned below and supporting said solids-gas separating compartment and said first and second filtering compartments of said multiple filtering compartments, said bin having a collection compartment for receiving and collecting the removed large particulates of dust from said solids-gas separator and smaller particulates from said first and second filtering compartments;

said bin being selected from the group consisting of a stationary bin, a moveable bin, a portable bin, an a towable bin;

said first and second filtering compartments each defining an open bottom communicating with said bin for discharging filtered particulates from said first and second filtering compartments of said multiple filter compartments into said bin; and said open bottoms of said multiple filtering compartments providing passageways for upward flow of the partially dedusted gas stream from said solids-gas separating compartment upwardly through said multiple filtering compartments.

2. An industrial dust collector in accordance with claim 1 wherein said solids-gas separator comprises a tangential cyclone positioned between said first and second filtering compartments.

3. An industrial dust collector in accordance with claim 1 wherein said solids-gas separating compartment is positioned between and separates said first filtering compartment and second filtering compartment, and solids gas-separating compartment is located above and supported by said bin.

4. An industrial dust collector in accordance with claim 1 including:

a motor; and a vacuum pump connected to said motor for drawing influent dusty air through said inlet conduit into said solids-gas separating compartment.

5. An industrial dust collector in accordance with claim 4 including a sound attenuating device providing a muffler for dampening noise emitted from said motor and pump.

6. An industrial dust collector in accordance with claim 1 including:

a third filtering compartment positioned generally along side and spaced laterally away from said solids-gas separating compartment and in offset relationship thereto, rather than in vertical alignment or completely above said solids-gas separating compartment, said third filtering compartment being spaced laterally away from said first filtering compartment rather than in vertical alignment therewith, said third filtering compartment being spaced laterally from said second filtering compartment rather than in vertical alignment therewith, said third filtering compartment cooperating with said second filtering compartment and said first filtering compartment and simultaneously filtering said partially dedusted gas stream with said second filtering compartment and said fist filtering compartment, said third filtering compartment having at least one third filter for filtering a third portion of said partially dedusted gas stream, at least one third compressed air tank communicating with said third filtering compartment, and at least one third air injector operatively connected to said third compressed air tank for injecting compressed air with sufficient kinetic energy into said third filter in said third filtering compartment to help clean said third filter in said third filtering compartment; and said third filtering compartment being located above and supported by said bin, and said third filtering compartment defining an open bottom for discharging fine particles from said third filtering compartment into said bin.

7. An industrial dust collector in accordance with claim 1 wherein said solids-gas separator comprises at least one member selected from the group consisting of: a barrier wall, an impact plate, a strike plate, and a deflector.

8. An industrial dust collector in accordance with claim 1 wherein at least one of said filters comprises a tubular filter, bag filter, canister filter, or cartridge filter.

9. An industrial dust collector in accordance with claim 1 wherein at least one of said filters is selected from the group consisting of: a Hepa filter, a bag filter, a box filter, an envelope filter, a flat filter, and a conical filter.

10. An industrial dust collector, comprising:
at least one solids-gas separating compartment comprising a tangential cyclone separator for providing a gross separation to remove large particulates of dust from an influent dusty stream to provide a grossly separated effluent dusty stream having a lower concentration of particulates by weight than said influent dusty stream, said solids-gas separating compartment having at least one inlet conduit for feeding said influent dusty stream to said tangential cyclone separator, and a separator-outlet conduit for discharging said grossly separated effluent dusty stream from said solids-gas separating compartment;

filtering compartments comprising a first filtering compartment, a second filtering compartment and a third filtering compartment, all of said filtering compartments being operatively connected to each other for filtering said grossly separated effluent dusty stream from said tangential cyclone separator at the same time;

said first filtering compartment having a first filtering chamber containing a set of first filters for filtering smaller particulates of dust from a first portion of the grossly separated effluent dusty stream from said solids-gas separating compartment to provide a first filtered stream having a lower concentration of particulates by weight than said grossly separated effluent dusty stream, said first filters being selected from the group consisting of tubular filters, bag filters, canister filters, and cartridge filters, a set of first compressed air tanks communicating with said first filtering compartment, an array of first air injectors operatively connected to said first compressed air tanks for intermittently injecting pulses of compressed air with sufficient kinetic energy to said set of first filters in said first filtering compartment to help clean said set of first filters in said first filtering compartment, and said first filtering compartment being positioned generally along side and spaced laterally away from said solids-gas separating compartment and in offset relationship thereto rather than in vertical alignment therewith;

a first discharge outlet conduit for discharging said first filtered stream from said first filtering compartment;

said second filtering compartment containing at least one second filter for filtering smaller particulates of dust from a second portion of the grossly separated effluent dusty stream from said solids-gas separating compartment to provide a second filtered stream having a lower concentration of particulates by weight than said grossly separated effluent dusty stream, at least one second compressed air tank communicating with said second filtering compartment, at least one second air injector operatively connected to said second compressed air tank for intermittently injecting pulses of compressed air with sufficient kinetic energy to said second filter in said second filtering compartment to help clean said second filter in said second filtering compartment, said second filtering compartment being positioned generally along side and spaced laterally away from said solids-gas separating compartment and in offset relationship thereto, and said second filtering compartment being spaced laterally away from said first filtering compartment rather than in vertical alignment therewith;

a second discharge outlet conduit for discharging said second filtered stream from said second filtering compartment;

said third filtering compartment containing at least one third filter for filtering smaller particulates of dust from a third portion of the grossly separated effluent dusty stream from said solids-gas separating compartment to provide a third filtered stream having a lower concentration of particulates by weight than said grossly separated effluent dusty stream, at least one third compressed air tank communicating with said third filtering compartment, at least one third air injector operatively connected to said third compressed air tank for intermittently injecting pulses of compressed air with sufficient kinetic energy to said third filter in said third filtering compartment to help clean said third filter in said third filtering compartment, said third filtering compartment being positioned generally along side and spaced laterally away from said solids-gas separating compartment and in offset relationship thereto, said third filtering compartment being spaced laterally away from said first filtering compartment, and said third filtering compartment being spaced laterally away from said second filtering compartment rather than in vertical alignment therewith; and a third discharge outlet conduit for discharging said third filtered stream from said third filtering compartment.

11. An industrial dust collector, comprising:
at least one solids-gas separation compartment comprising at least one solids-gas separator for removing large particulates of dust from a dusty gas stream to provide a partially dedusted stream;

said solids-gas separator being selected from the group consisting of a tangential cyclone separator, a barrier wall, an impact plate, a strike plate, and a deflector;

multiple filter compartments positioned about said solids-gas separation compartment for filtering a substantial amount of remaining fine particulates of dust from the partially dedusted gas stream, said multiple filter compartments defining open bottoms for upward flow and passage of the partially dedusted stream from said solids-gas separation compartment upwardly through said multiple filter compartments, said multiple filter compartments comprising at least two filter compartments operating together at the same time for concurrently filtering and dedusting a substantial amount of remaining fine particulates of dust from the partially dedusted gas stream; and a single hopper providing a unitary common bin positioned below and supporting said solids-gas separation compartment and said multiple filter compartments, said bin having a collection compartment for receiving and collecting the removed large particulates form said solids-gas separator and the filtered fine particulates of dust from said multiple filter compartments.

12. An industrial dust collector in accordance with claim 11 wherein said filters are positioned concentrically or eccentrically about said solids-gas separation compartment.

13. An industrial dust collector in accordance with claim 11 wherein at least some of said filters are positioned in an annular filter compartment.

14. An industrial dust collector in accordance with claim 11 wherein said industrial dust collector is selected from the group consisting of: an industrial vacuum cleaner, an industrial vacuum loader, and an industrial solids-gas conveyor.

15. An industrial dust collector in accordance with claim 11 wherein at least some of said filters are selected from the group consisting of one or more: tubular filters, canister filters, cartridge filters, Hepa filters, bag filters, box filters, envelope filters, flat filters, conical filters, and combinations thereof.

16. An industrial dust collector, comprising:
- at least one solids-gas separating compartment comprising a tangential cyclone separator for providing a gross separation to tangentially remove large particulates of dust from an a tangentially flowing influent dusty stream to provide a grossly separated effluent dusty stream having a lower concentration of particulates by weight than said influent dusty stream, said solids-gas separating compartment having at least one inlet conduit for feeding said influent dusty stream to said tangential cyclone separator, and a separator-outlet conduit for discharging said grossly separated effluent dusty stream from said solids-gas separating compartment;
- concurrently operating multiple filtering compartments in communication with said tangential cyclone separator, said multiple filtering compartments comprising a first filtering compartment, a second filtering compartment and a third filtering compartment, said multiple filtering compartments having open bottoms for receiving said grossly separated effluent dusty stream from said tangential cyclone separator of said solids-gas separating compartment, said multiple filtering compartments cooperating with each other for concurrently filtering said grossly separated effluent dusty stream from said tangential cyclone separator, said multiple filtering compartments filtering together at the same time in the absence of purging and cleaning filters;
- a hopper comprising a bin positioned below and supporting said solids-gas separation compartment, said bin having a collection compartment for receiving and collecting larger particulates of dust from said solids-gas separating compartment and filtered particulates of fine dust from the multiple filtering compartments, and said bin being selected from the group consisting of a stationary bin, a movable bin, a portable bin, and a towable bin;
- said first filtering compartment having a first filtering chamber containing a set of first filters for filtering smaller particulates of dust from a first portion of the grossly separated effluent dusty stream from said solids-gas separating compartment to provide a first filtered stream having a lower concentration of particulates by weight than said grossly separated effluent dusty stream, said first filters being selected from the group consisting of tubular filters, bag filters, canister filters, and cartridge filters, a set of first compressed air tanks communicating with said first filtering compartment, an array of first air injectors operatively connected to said first compressed air tanks for intermittently injecting pulses of compressed air with sufficient kinetic energy to said set of first filters in said first filtering compartment to help clean said set of first filters in said first filtering compartment, and said first filtering compartment being positioned generally along side and spaced laterally away from said tangential cyclone separator of said solid-gas separating compartment and in offset relationship thereto rather than in vertical alignment therewith;
- a first discharge outlet conduit for discharging said first filtered stream from said first filtering compartment;
- a second filtering compartment containing at least one second filter for filtering smaller particulates of dust from a second portion of the grossly separated effluent dusty stream from said solids-gas separating compartment to provide a second filtered stream having a lower concentration of particulates by weight than said grossly separated effluent dusty stream, said second filtering compartment operating and filtering said grossly separated effluent dusty stream concurrently with said first filtering compartment and said second filtering compartment, at least one second compressed air tank communicating with said second filtering compartment, at least one second air injector operatively connected to said second compressed air tank for intermittently injecting pulses of compressed air with sufficient kinetic energy to said second filter in said second filtering compartment to help clean said second filter in said second filtering compartment, said second filtering compartment being positioned generally along side and spaced laterally away from said tangential cyclone separator of said solids-gas separating compartment and in offset relationship thereto, and said second filtering compartment being spaced laterally away from said first filtering compartment rather than in vertical alignment therewith;
- a second discharge outlet conduit for discharging said second filtered stream from said second filtering compartment;
- a third filtering compartment containing at least one third filter for filtering smaller particulates of dust from a third portion of the grossly separated effluent dusty stream from said solids-gas separating compartment to provide a third filtered stream having a lower concentration of particulates by weight than said grossly separated effluent dusty stream, said third filtering compartment operating and filtering said grossly separated effluent dusty stream concurrently with said first filtering compartment and said second filtering compartment, at least one third compressed air tank communicating with said third filtering compartment, at least one third air injector operatively connected to said third compressed air tank for intermittently injecting pulses of compressed air with sufficient kinetic energy to said third filter in said third filtering compartment to help clean said third filter in said third filtering compartment, said third filtering compartment being positioned generally along side and spaced laterally away from said tangential cyclone separator of said solids-gas separating compartment and in offset relationship thereto, said third filtering compartment being spaced laterally away from said first filtering compartment, and said third filtering compartment being spaced laterally away from said second filtering compartment rather than in vertical alignment therewith; and a third discharge outlet conduit for discharging said third filtered stream from said third filtering compartment.

17. An industrial dust collector in accordance with claim 16 wherein said solids-gas separating compartment is positioned between and separates said first filtering compartment and said second filtering compartment.

18. An industrial dust collector in accordance with claim 16 wherein said solids-gas separating compartment is positioned between and separates said first filtering compartment and said third filtering compartment.

19. An industrial dust collector in accordance with claim 16 wherein said second filtering compartment is positioned generally along side of said third filtering compartment.

20. An industrial dust collector in accordance with claim 16 wherein said first filtering compartment is positioned diametrically opposite said second filtering compartment and said third filtering compartment.

21. An industrial dust collector in accordance with claim 16 including a blower line extending between and communicating with said first discharge outlet conduit and said third discharge outlet conduit.

22. An industrial dust collector in accordance with claim 16 wherein said second filter is selected from the group consisting of: a second tubular filter, a bag filter, a canister filter, and a cartridge filter.

23. An industrial dust collector in accordance with claim 16 wherein said third filter is selected from the group consisting of: a third tubular filter, a bag filter, a canister filter, and a cartridge filter.

24. An industrial dust collector in accordance with claim 16 including:

a motor positioned in proximity to said second filtering compartment;

said second filtering compartment disposed between said solids-gas separating compartment and said motor;

a vacuum pump comprising an air blower operatively connected to said motor for drawing said influent dusty stream through said inlet conduit to said solids-gas separating compartment, said vacuum pump being positioned in proximity to said third filtering compartment;

said third filtering compartment disposed between said solids-gas separating compartment and said vacuum pump; and a base for supporting said vacuum pump and motor, said base comprising a sound attenuating device providing a muffler for dampening noise emitted from said motor and pump.

25. An industrial dust collector in accordance with claim 24 wherein said bin has a lower portion with a power-operated slidable valve for discharging the collected particulates in said bin.

26. An industrial dust collector in accordance with claim 24 wherein said air injectors are positioned at an elevation above said filters, pumps, motor, and tangential cyclone separator.

\* \* \* \* \*